(12) United States Patent
Alstrin et al.

(10) Patent No.: US 9,079,630 B2
(45) Date of Patent: Jul. 14, 2015

(54) STEERING STEM ASSEMBLY FOR A MOTORCYCLE

(71) Applicant: Harley-Davidson Motor Company Group, LLC, Milwaukee, WI (US)

(72) Inventors: Michael W. Alstrin, Sussex, WI (US); Eric Konkel, Wauwatosa, WI (US); Joshua Hedtke, Brookfield, WI (US); Stephen Hebert, Franklin, WI (US); Troy Schneiker, West Allis, WI (US)

(73) Assignee: Harley-Davidson Motor Company Group, LLC, Milwaukee, WI (US)

( * ) Notice: Subject to any disclaimer, the term of this patent is extended or adjusted under 35 U.S.C. 154(b) by 1 day.

(21) Appl. No.: 13/967,407

(22) Filed: Aug. 15, 2013

(65) Prior Publication Data

US 2015/0047455 A1 Feb. 19, 2015

(51) Int. Cl.
*B62K 21/18* (2006.01)
*B62K 21/12* (2006.01)
*B62K 21/06* (2006.01)

(52) U.S. Cl.
CPC .................. *B62K 21/18* (2013.01); *B62K 21/06* (2013.01); *B62K 21/12* (2013.01)

(58) Field of Classification Search
CPC ......... B52K 21/06; B52K 21/12; B52K 21/18
USPC .................................................. 74/492, 499
See application file for complete search history.

(56) References Cited

U.S. PATENT DOCUMENTS

| | | | |
|---|---|---|---|
| 6,474,875 B1 | 11/2002 | Waseda et al. | |
| 6,592,148 B2 | 7/2003 | Byers et al. | |
| 6,668,968 B2 | 12/2003 | Hasegawa et al. | |
| 6,711,965 B2 | 3/2004 | Tomaru et al. | |
| 6,712,541 B1 * | 3/2004 | Henricksen | 403/344 |
| 7,118,302 B1 | 10/2006 | Durham | |
| 7,191,679 B2 | 3/2007 | Tomaru et al. | |
| 7,258,356 B2 | 8/2007 | Okazaki et al. | |
| 7,401,677 B2 | 7/2008 | Boyle et al. | |
| 7,637,667 B1 | 12/2009 | Schaub | |
| 7,686,115 B2 | 3/2010 | Parker | |
| 7,686,336 B2 | 3/2010 | Cullier et al. | |
| 7,942,433 B2 | 5/2011 | Miyamoto | |
| 7,963,540 B2 * | 6/2011 | Lane | 280/279 |
| 7,976,045 B2 * | 7/2011 | Lane | 280/279 |
| 8,087,685 B2 | 1/2012 | Weidner | |
| 8,151,667 B2 | 4/2012 | Appleyard | |

(Continued)

FOREIGN PATENT DOCUMENTS

| | | |
|---|---|---|
| JP | S496913 Y1 | 2/1974 |
| JP | S5123937 U | 2/1976 |

(Continued)

*Primary Examiner* — Nicole Verley

(74) *Attorney, Agent, or Firm* — Michael Best & Friedrich LLP

(57) ABSTRACT

A steering stem assembly for rotatably coupling a steering assembly to a steering head of a motorcycle main frame. The steering stem assembly includes a first stem member configured to support a first end of the steering assembly on a first end of the steering head and a second stem member configured to support a second end of the steering assembly on a second end of the steering head. The second stem member is formed separately from the first stem member. A joint is defined between the first and second stem members and fixedly secures the first stem member with the second stem member.

19 Claims, 6 Drawing Sheets

(56) References Cited

U.S. PATENT DOCUMENTS

| | | | |
|---|---|---|---|
| 8,225,897 B1 | 7/2012 | Hollingsworth | |
| 8,272,460 B2 * | 9/2012 | Song et al. | 180/6.24 |
| 8,317,214 B2 | 11/2012 | Athanasiou | |
| 2005/0167168 A1 | 8/2005 | Puzey | |
| 2008/0048412 A1 * | 2/2008 | Dror | 280/288.3 |
| 2008/0073870 A1 * | 3/2008 | Lane | 280/280 |
| 2008/0129009 A1 * | 6/2008 | Czysz | 280/275 |
| 2008/0190236 A1 * | 8/2008 | Taylor | 74/551.8 |
| 2008/0296077 A1 * | 12/2008 | Miyamoto | 180/219 |
| 2009/0283985 A1 * | 11/2009 | Lane | 280/279 |
| 2010/0139438 A1 | 6/2010 | Appleyard et al. | |
| 2010/0237584 A1 * | 9/2010 | Lin | 280/280 |
| 2011/0239809 A1 | 10/2011 | Beneker et al. | |
| 2011/0241327 A1 | 10/2011 | Montboeuf et al. | |

FOREIGN PATENT DOCUMENTS

| | | |
|---|---|---|
| JP | S57167915 | 10/1982 |
| JP | S58157788 U | 10/1983 |

* cited by examiner

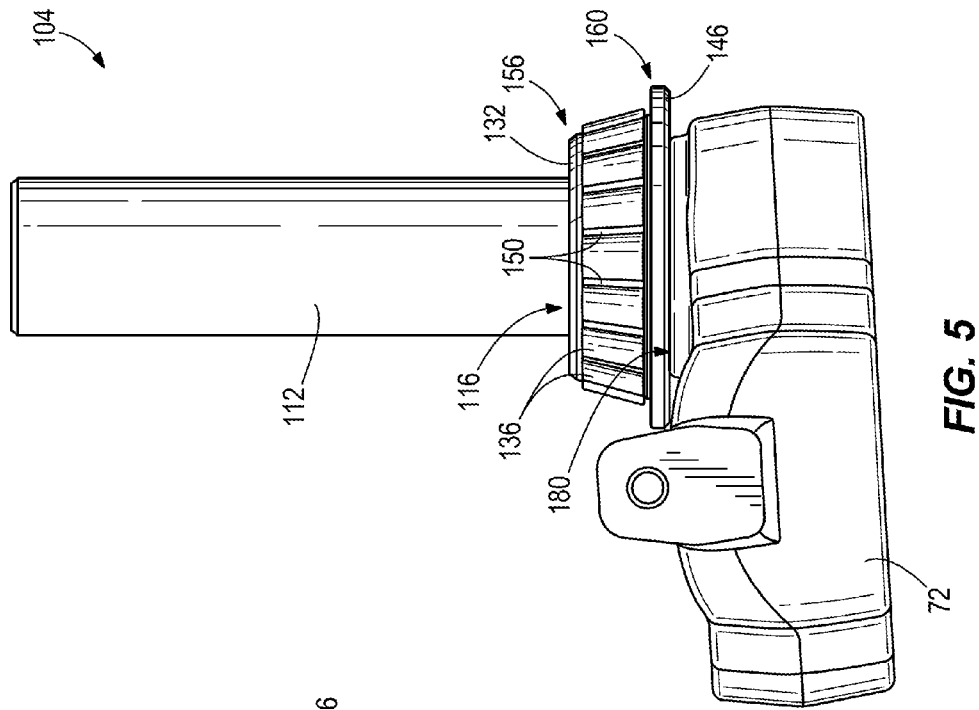
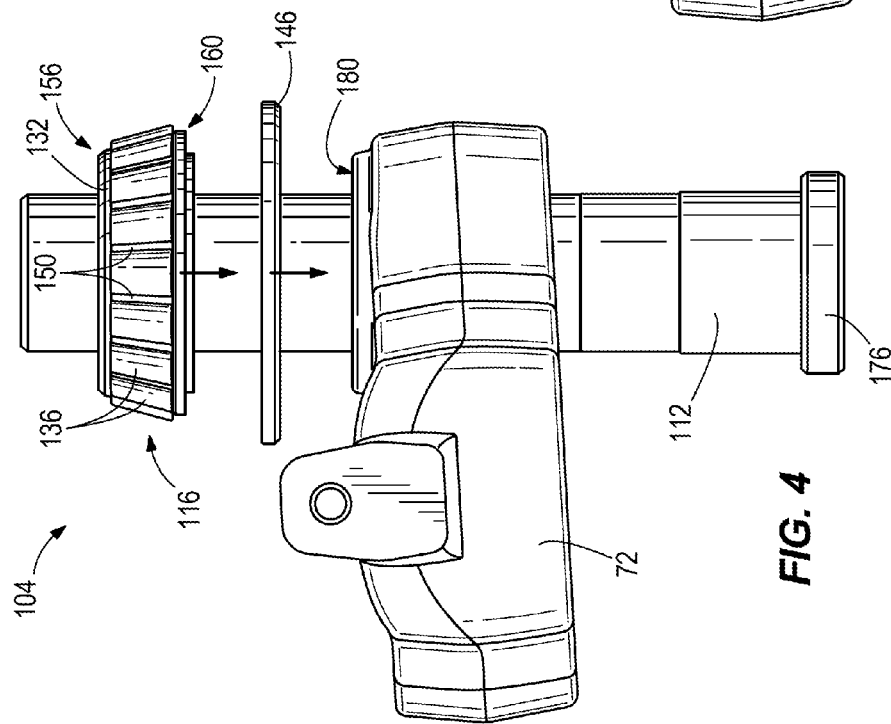

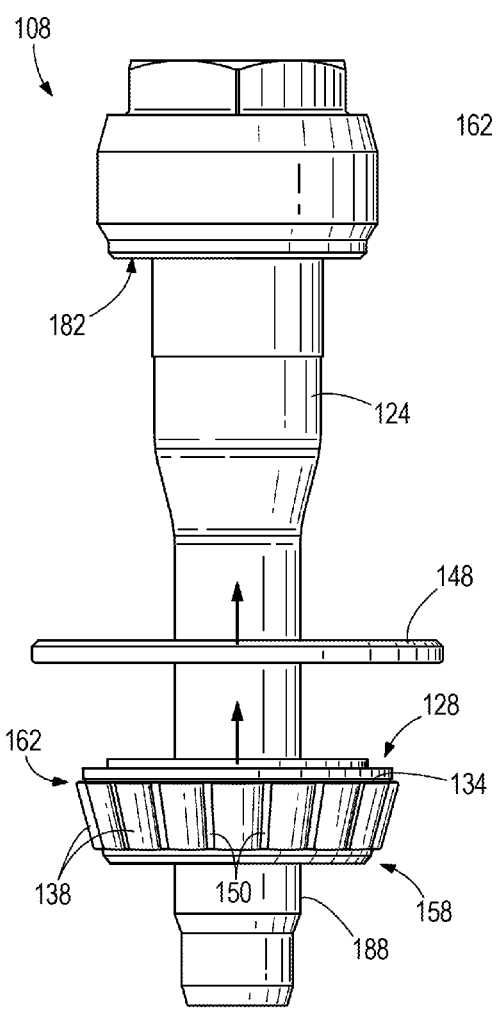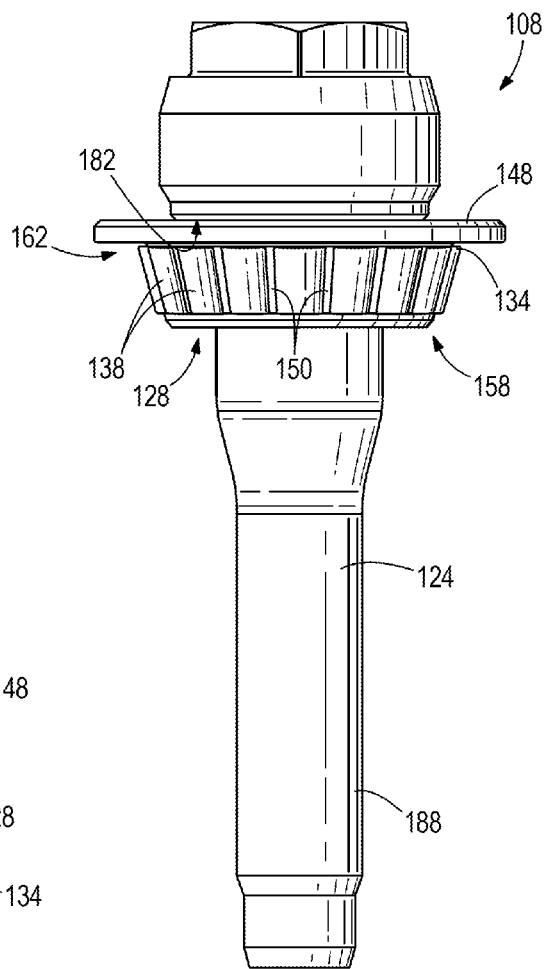
FIG. 6
FIG. 7

STEERING STEM ASSEMBLY FOR A MOTORCYCLE

BACKGROUND

The present invention relates to a steering assembly for a motorcycle.

The steering assembly of a motorcycle typically includes a steering stem that couples a front wheel and the handlebars to the main frame for providing steering inputs to the front wheel of the motorcycle. The steering stem extends through a steering head of the main frame between an upper triple clamp and a lower triple clamp. In particular, the upper triple clamp couples the steering stem, a pair of fork tubes, and handlebars to the steering head. The lower triple clamp couples the steering stem and the front wheel, which is coupled to a pair of fork tubes, to an opposite side of the steering head. The steering stem is a single piece and can only be inserted from one end into the steering head to be supported by upper and lower bearings positioned therein. Thus, one or both of the bearings must be provided with radial clearance to the steering stem to enable assembly. Due to the radial clearance, a high steering joint clamp load is desired to limit slip between the stem and the inner races of the bearings. However, clamp load can only be increased to a certain point before compromising ideal steer damping and handling performance.

SUMMARY

In one aspect, the invention provides a steering stem assembly for rotatably coupling a steering assembly to a steering head of a motorcycle main frame. The steering stem assembly includes a first stem member configured to support a first end of the steering assembly on a first end of the steering head and a second stem member configured to support a second end of the steering assembly on a second end of the steering head. The second stem member is formed separately from the first stem member. A joint is defined between the first and second stem members and fixedly secures the first stem member with the second stem member.

In another aspect, the invention provides a motorcycle including a main frame configured to support a drive unit, at least one rear wheel, and at least one seat. The motorcycle further includes a steering head fixedly secured to the main frame and having a bore between a first end and a second end of the steering head. The bore defines a steering axis. A steering stem assembly includes at least one steerable front wheel rotatable about the steering axis relative to the steering head. A first stem member extends through the bore from the first end, and a second stem member extends through the bore from the second end. The first stem member is fixedly secured to the second stem member within the bore.

In another aspect, the invention provides a method of assembling a steering assembly of a motorcycle. A main frame is provided having a steering head including a bore defining opposing upper and lower ends. A first stem member is inserted into the lower end of the bore of the steering head, and a second stem member is inserted into the upper end of the bore of the steering head. The second stem member is fixedly secured to the first stem member at a joint within the bore.

Other aspects of the invention will become apparent by consideration of the detailed description and accompanying drawings.

BRIEF DESCRIPTION OF THE DRAWINGS

FIG. 4 is an unassembled view of the lower support assembly of FIG. 3.

FIG. 5 is an assembled view of the lower support assembly of FIG. 3.

FIG. 6 is an unassembled view of the upper support assembly of FIG. 3.

FIG. 7 is an assembled view of the upper support assembly of FIG. 3.

DETAILED DESCRIPTION

Before any aspects of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
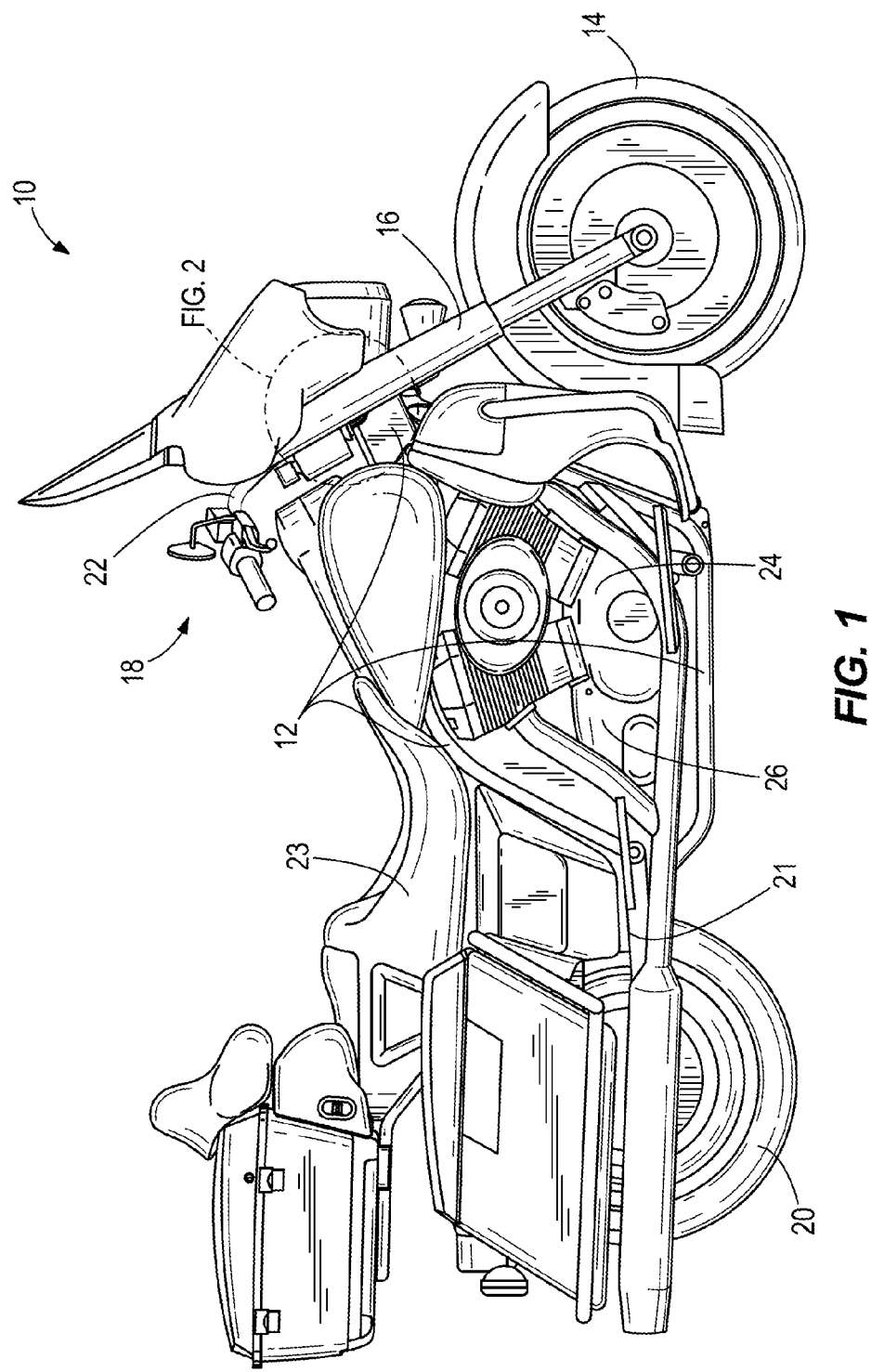
FIG. 1 is a side view of a motorcycle including a two-piece steering stem assembly according to one embodiment of the invention.

FIG. 1 illustrates a motorcycle 10 including a main frame 12, a front wheel 14 coupled to the main frame 12 by a pair of fork tubes 16 (only one of which is shown), a steering assembly 18, a rear wheel 20 coupled to the main frame 12 through a swing arm 21, and at least one straddle seat 23 for supporting a rider, and optionally a passenger. The steering assembly 18 includes handlebars 22 for navigating the motorcycle 10. The motorcycle 10 includes a drive unit 24 (e.g., an engine such as an internal combustion engine) coupled to the main frame 12 and drivingly coupled to the rear wheel 20. In the illustrated construction, the drive unit 24 includes a V-twin engine coupled to the rear wheel 20 through a multi-gear transmission 26.

Figure 2:
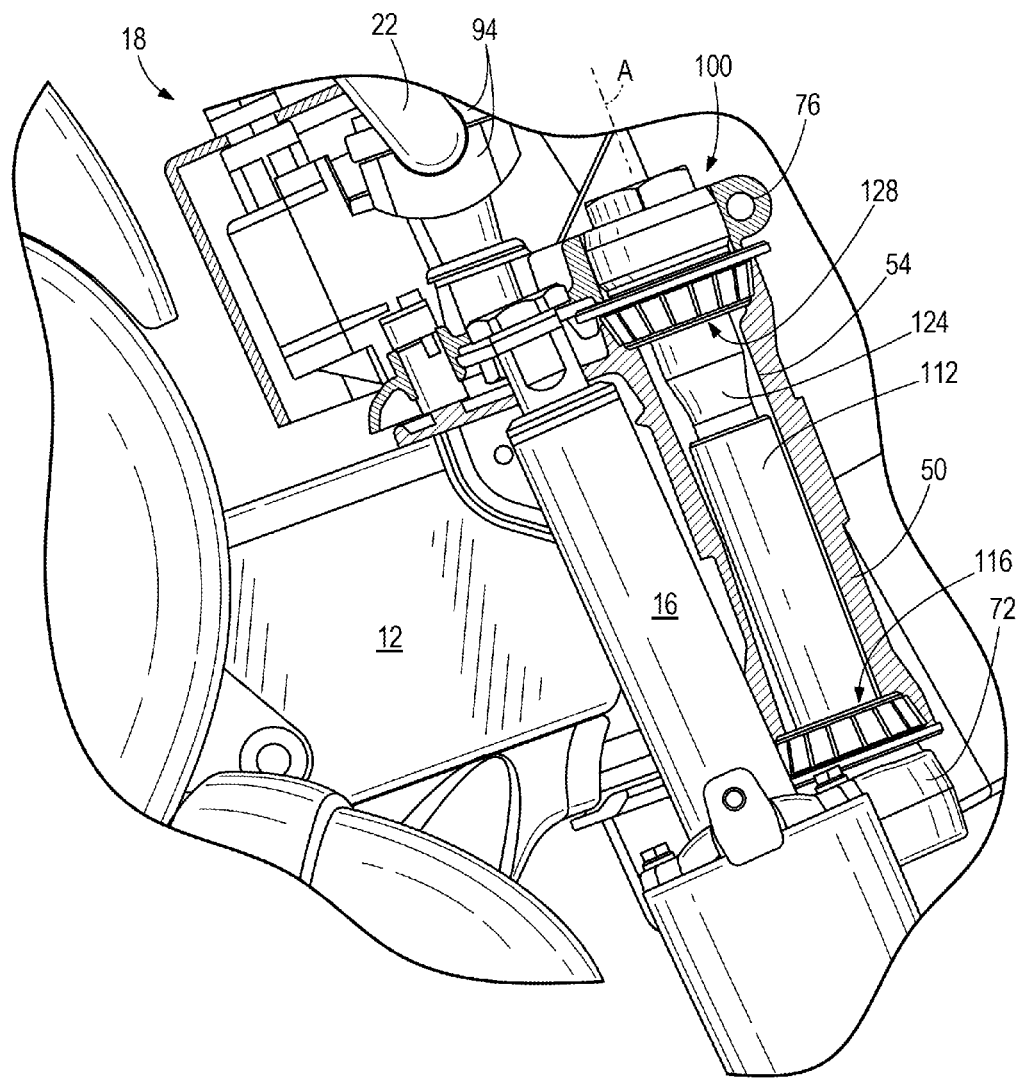
FIG. 2 is a side view of a steering assembly of the motorcycle of FIG. 1, with a portion cut away to illustrate the two-piece steering stem assembly.
Figure 3:
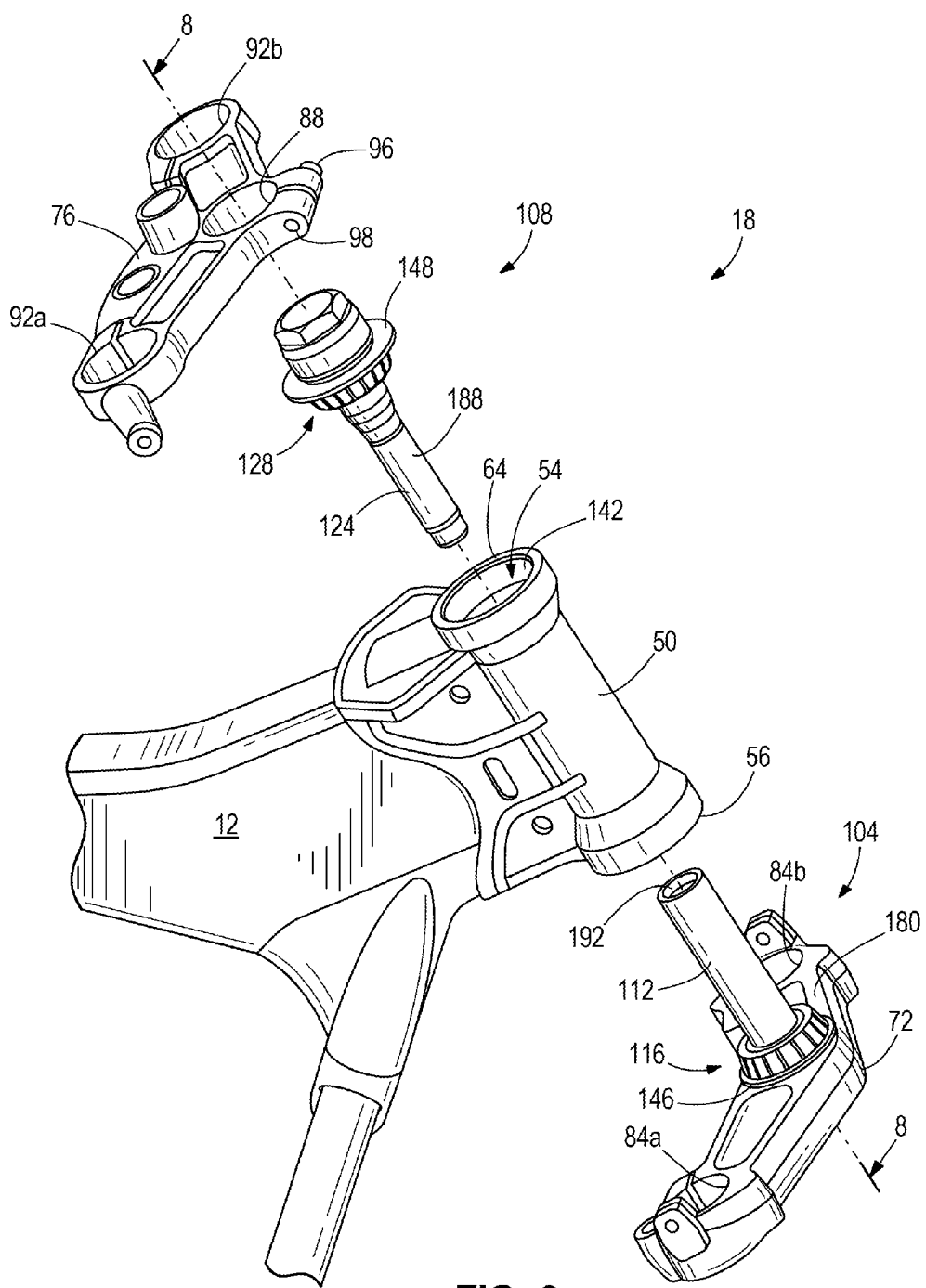
FIG. 3 is exploded view of the steering stem assembly of FIG. 2 including a lower support assembly and an upper support assembly.
Figure 8:
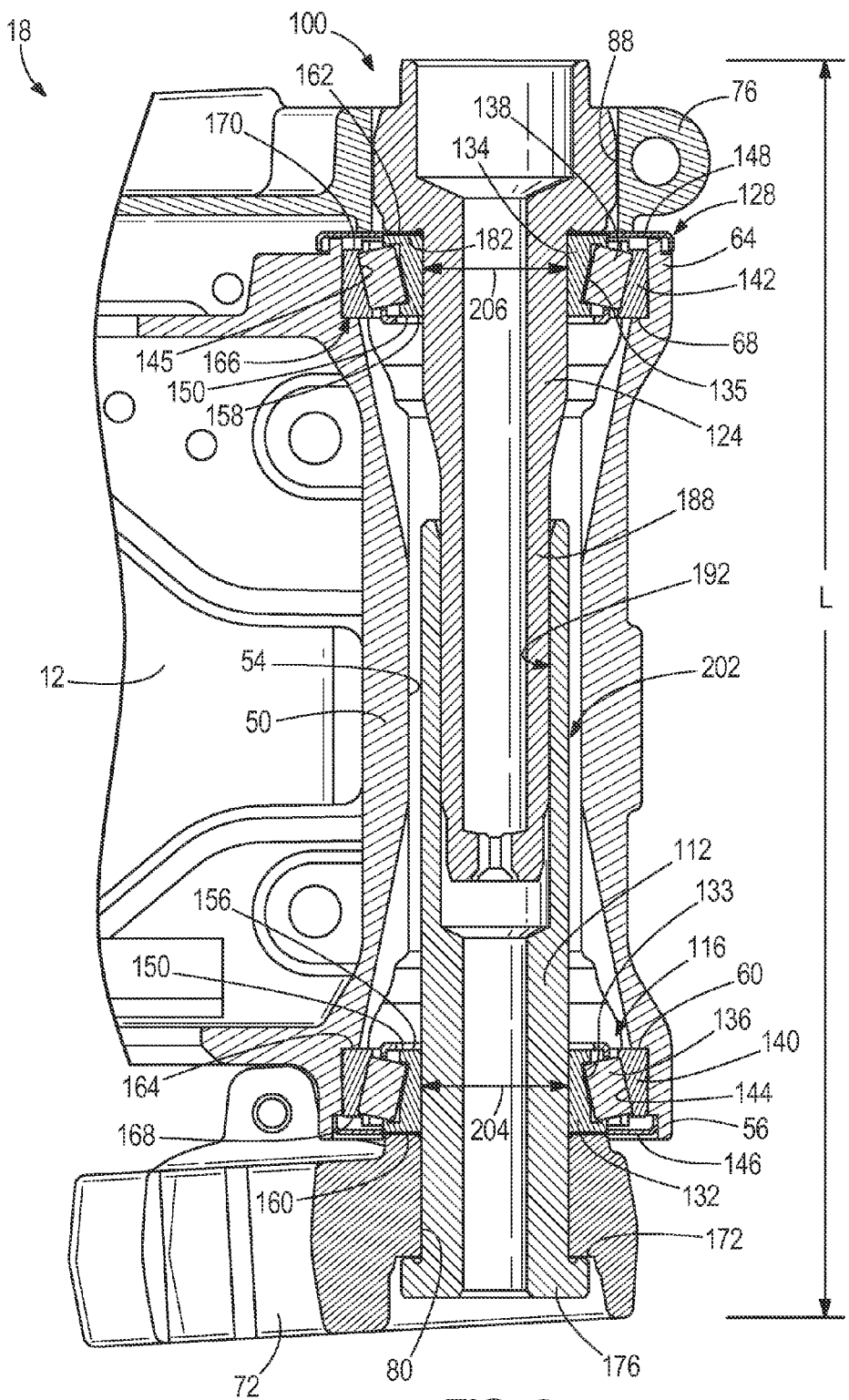
FIG. 8 is a cross-sectional view of the steering stem assembly, taken along line 8-8 of FIG. 3.

FIGS. 2-3 illustrate the steering assembly 18 in greater detail. The steering assembly 18 couples the front wheel 14, the fork tubes 16, and the handlebars 22 to the main frame 12. The steering assembly 18 is rotatably supported relative to the motorcycle 10 by a steering head 50, which is integrally coupled to the main frame 12 of the motorcycle 10. As shown in FIGS. 2, 3, and 8, the steering head 50 defines a through-hole or bore 54 that defines a steering axis A and extends between a first or lower end 56 of the steering head 50 and a second or upper end 64 of the steering head 50. A first counterbore 60 is provided at the first end 56 of the bore 54, and a second counterbore 68 is provided at the second end 64 of the bore 54. The steering head 50 receives and supports a steering stem assembly 100, which extends through the bore 54 of the steering head 50 to secure the front wheel 14 and handlebars 22 on opposite sides of the steering head 50. The steering assembly 18 further includes a lower triple clamp 72 and an upper triple clamp 76, which are configured to be coupled to the steering stem assembly 100. The lower triple clamp 72 includes a stem-receiving aperture or through-hole 80 (FIG. 8) and first and second fork-receiving apertures or through-holes 84a, 84b located on opposite sides of the stem-receiving through-hole 80. Likewise, the upper triple clamp 76 includes a stem-receiving aperture or through-hole 88 and first and second fork-receiving through-holes 92a, 92b. The through-holes 80, 84a, 84b of the lower triple clamp 72 are axially aligned with the respective through-holes 88, 92a, 92b of the upper triple clamp 76. The upper triple clamp 76 may also include one or more supports for mounting the handlebar 22 to the upper triple clamp 76 to provide the rider control of the steering assembly 18. FIG. 2 illustrates a riser 94 which clamps the handlebars 22 and mounts to the upper triple clamp 76.

With further reference to FIGS. 2 and 3, one of the fork tubes 16 extends through the corresponding through-holes 84a, 92a of both of the triple clamps 72, 76 on a first lateral side of the front wheel 14, while the other fork tube 16 extends through the corresponding through-holes 84b, 92b of both of the triple clamps 72, 76 on a second lateral side of the front wheel 14. Each of the fork tubes 16 is fixedly secured with both the lower and upper triple clamps 72, 76 so that the front wheel 14 is moved pivotally with respect to the steering head 50 in direct response to pivoting of the handlebars 22 secured to the upper triple clamp 76. In the illustrated embodiment, the fork-receiving through-holes 84a, 84b, 92a, 92b in the lower and upper triple clamps 72, 76 are each tightened or clamped around the respective fork tubes 16 with a fastener such as a pinch bolt (not shown). Similarly, each of the stem-receiving through-holes 80, 88 receives and is securely fastened to at least a portion of the steering stem assembly 100. As will be described in greater detail below, the stem-receiving through-hole 88 in the upper triple clamp 76 is secured to the steering stem-assembly 100 with a pinch bolt or other fastener 96, which extends through an aperture 98 oriented perpendicular to the axis A and tightens the stem-receiving through-hole 88 about the steering stem-assembly 100. In other constructions, other coupling methods may be implemented to couple the fork tubes 16 and the steering stem assembly 100 to the upper triple clamp 76.

The steering stem assembly 100 includes a lower support assembly 104 (FIGS. 4-5) and an upper support assembly 108 (FIGS. 6-7). The lower support assembly 104 includes a first or lower stem member 112, and the upper support assembly 108 includes a second or upper stem member 124. The first and second stem members 112, 124 are formed separately from each other. The first stem member 112 extends through and is supported at the first end 56 of the steering head 50, and the second stem member 124 extends through and is supported at the second end 64 of the steering head 50. In particular, at least a portion of the first stem member 112 extends into the bore 54 from the first side 56 of the steering head 50. Similarly, at least a portion of the second stem member 124 extends into the bore 54 from the second side 64 of the steering head 50. As such, the first and second stem members 112, 124 are positioned on opposite sides of the steering head 50. As shown in at least FIG. 3, the first stem member 112 includes a female threaded portion 192 (e.g., threaded bore) and the second stem member 124 includes a male threaded portion 188 (e.g., threads on at least a portion of the external surface). Therefore, the female threaded portion 192 is configured to threadingly receive and secure the male threaded portion 188 to define a joint 202 as shown in FIG. 8. In other constructions, the male and female threads are reversed between the first and second stem members 112, 124, and in other constructions still, structures other than threads are provided to immovably secure the joint 202 between the first and second stem members 112, 124.

As shown in FIG. 8, the lower and upper support assemblies 104, 108 also include first and second bearings 116, 128, respectively, which are of substantially the same construction. Each of the bearings 116, 128 is a separable tapered roller bearing in the illustrated construction. With respect to FIGS. 3 and 8, each of the first bearing 116 and the second bearing 128 includes a first, inner race 132, 134 having a tapered outer surface 133, 135 and an outer race 140, 142 having a tapered inner surface 144, 145. Each of the bearings 116, 118 includes a cage element 150 housing a plurality of circumferentially distributed rolling elements 136, 138 (i.e., rollers). The rollers 136, 138 are positioned radially between the inner race 132, 134 and the outer race 140, 142 of the corresponding bearing 116, 128 to enable low friction rolling of the rollers 136, 138 between the inner races 132, 134 and the outer races 140, 142. An inner diameter 204, 206 of each inner race 132, 136 is sized and shaped to receive and be secured to the corresponding stem member 112, 124 in a press-fit engagement (i.e., a zero-clearance mating interface). The outer races 140, 142 are sized and shaped to be received in the respective first and second ends 56, 64 of the bore 54 in the steering head 50. As illustrated in FIG. 8, the counterbores 60, 68 at the ends of the bore 54 receive the respective outer races 140, 142. The counterbores 60, 68 act as a stop surface for accurately positioning the outer races 140, 142 relative to the steering head 50. The inner races 132, 134 are sized and shaped to be received by the respective outer races 140, 142. The inner races 132, 134 and the outer races 140, 142 are complementary. In other words, the inner race 132, 134 of each of the bearings 116, 128 has a smaller outer diameter at a first end 156, 158 and gradually increases in diameter towards a second end 160, 162. Likewise, the outer race 140, 142 has a smaller inner diameter at a first end 164, 166, which gradually increases towards a second end 168, 170. The bearings 116, 128 may have alternative or additional constructions or features other than those illustrated and described herein. Each of the lower support assembly 104 and the upper support assembly 108 can also extend through through-holes or apertures in corresponding dust shields 146, 148, which are coupled between the lower and upper triple clamps 72, 76 and the respective bearing 116, 128 as shown in FIGS. 4-7.

With reference to FIGS. 4, 5, and 8, the lower support assembly 104 is fixedly secured to the lower triple clamp 72 and rotatably coupled to the first end 56 of the steering head 50. As illustrated, the first stem member 112 extends through the stem-receiving through-hole 80 in the lower triple clamp 72 and into the first end 56 of the bore 54 of the steering head 50. The stem-receiving through-hole 80 of the lower triple clamp 72 includes a counter bore 172, which acts as a stop surface for a flange 176 of the first stem member 112 provided at its lowermost end. The inner race 132 of the first bearing 116 is pressed onto the first stem member 112 until the lower triple clamp 72 prevents further movement. The inner race 132 or the adjacent dust shield 146 may abut a first or upper surface 180 of the lower triple clamp 72. The rollers 136 may be assembled onto the inner race 132 prior to insertion of the lower support assembly 104 into the steering head bore 54. The outer race 140 is positioned (e.g., press-fit) in the counter bore 60 in the steering head 50. The inner race 132 and the rollers 136 are received by the outer race 140 as the first stem member 112 is inserted upwardly into the bore 54 from the lower end 56. As discussed above, the counter bore 60 acts as a stop surface for the outer race 140, limiting the distance the bearing 116, and therefore the first stem member 112, can extend into the bore 54. The lower triple clamp 72 may be pre-assembled with the lower support assembly 104 as a subassembly prior to coupling with the steering head 50.

With reference to FIGS. 6, 7, and 8, the upper support assembly 108 is fixedly secured to the upper triple clamp 76 and rotatably coupled to the second end 64 of the steering head 50. As illustrated in FIGS. 6 and 7, the inner race 134 of the second bearing 128 is press-fit onto the outside of the second stem member 124 to a final position as far to the upper end as possible. The inner race 134 or the adjacent dust shield 148 may abut a shoulder surface 182 of an upper end of the second stem member 124. The rollers 138 may be assembled onto the inner race 134 prior to insertion of the upper support assembly 108 into the steering head bore 54. The outer race 142 is positioned (e.g., press-fit) in the counter bore 68 in the steering head 50. The inner race 134 and the rollers 138 are received by the outer race 142 as the second stem member 124 is lowered into the bore 54 from the upper end 64. When assembled, the upper triple clamp 76 is positioned so that the upper end of the second stem member 124 is received by the stem-receiving through-hole 88 as shown in FIG. 8.

As illustrated in FIG. 8 and discussed above, the second stem member 124 is threadingly mated with the first stem member 112 within the bore 54. When the first and second stem members 112, 124 are secured to one another, they define a stem length L (FIG. 8) measured parallel with the steering axis A. Although the first and second stem members 112, 124 define overlapping portions, each of the first and second stem members 112, 124 defines less than 100 percent of the stem length L, and neither one of the first and second stem members 112, 124 extends all the way through the bore 54. As shown, each of the first and second stem members 112, 124 has a terminal end positioned within the bore 54 when the steering stem assembly 100 is assembled with the steering head 50.

As discussed above and further with respect to FIG. 8, the first and second stem members 112, 124 and their respective mating threaded portions 188, 192 define a threaded joint 202. In particular, the joint 202 is located where the threaded portions 188, 192 of each of the first and second stem members 112, 124 physically engage with each other within the bore 54. Because the stresses induced in the steering stem assembly 100 from operating loads (e.g., peak braking and harsh bumps) are lowest, the joint 202 is located between the first and second bearings 116, 128. Thus, the joint 202 may be positioned at or adjacent a point of minimum stress along the length L of the steering assembly 100. In the illustrated construction, the joint 202 is located centrally along the length L. However, the joint 202 can be located elsewhere along the stem length L in other constructions.

An additional advantage of the steering stem assembly 100 is that the zero clearance press-fits between the bearings 116, 128 and the respective stem members 112, 124 prevent slip at the interfaces therebetween, independently from the axial assembly load of the steering stem assembly 100. When the first and second stem members 112, 124 are coaxially fixed to one another at the joint 202 within the bore 54, the first bearing 116 is positioned at least partially within the bore 54 of the steering head 50 between the first end 56 of the steering head 50 and the first stem member 112, without any radial assembly clearance. Similarly, the second bearing 128 is positioned at least partially within the bore 54 between the second end 64 of the steering head 50 and the second stem member 124, without any radial assembly clearance. The steer damping and handling performance is independently controlled as a function of the axial assembly load, set by the tightening of the first and second stem members 112, 124.

With renewed reference to FIGS. 4 and 5, the steering assembly 18 of the motorcycle 10 is assembled by press-fitting the first stem member 112 through the stem-receiving through-hole 80 in the lower triple clamp 72. The dust shield 146 is slid onto the first stem member 112. The inner race 132 is positioned by press-fitting onto the first stem member 112 adjacent the first surface 180 of the lower triple clamp 72. The lower triple clamp 72 is fixedly secured to the first stem member 112 between the inner race 132 and the flange 176 of the first stem member 112. As illustrated in FIG. 8, the first stem member 112 is inserted into the bore 54 at the first end 56 of the steering head 50, where the outer race 140 is positioned within the counter bore 60. Upon insertion of the first stem member 112, the rollers 136 are sandwiched between the tapered outer surface 133 of the inner race 132 and the tapered inner surface 144 of the outer race 140. As such, the first stem member 112 and the first bearing 116 are at least partially positioned within the first end 56 of the bore 54.

With renewed reference to FIGS. 6 and 7, after the dust shield 148 is slid onto the second stem member 124, the inner race 134 of the second bearing 128 is positioned by press-fitting onto the second stem member 124. As illustrated in FIG. 8, the second stem member 124 is inserted into the second end 64 of the bore 54, where the outer race 142 is positioned within the counter bore 68. Upon insertion of the second stem member 124, the rollers 138 are sandwiched between the tapered outer surface 135 of the inner race 134 and the tapered inner surface 145 of the outer race 142. As such, the second stem member 124 and the second bearing 128 are at least partially positioned into the second end 64 of the bore 54.

Further with respect to FIG. 8, the second stem member 124 is then coupled to the first stem member 112 at the joint 202 within the bore 54. For example, in the illustrated embodiment, male threaded portion 188 of the second stem member 124 is threadingly received and secured within the female threaded portion 192 of the first stem member 112. Torque is applied to the second stem member 124 to develop a clamp load through the upper support assembly 108 as well as the lower support assembly 104. When the joint 202 is secured, the upper triple clamp 76 is placed onto the upper end of the second stem member 124 so that the second stem member 124 extends through the stem-receiving through-hole 88 in the upper triple clamp 76. The bolt 96 in the upper triple clamp 76 is torqued to provide a radial clamp to the upper end of the second stem member 124. Accordingly, the radial clamp secures the first and second stem members 112, 124, and therefore the lower and upper support assemblies 104, 108, as a unitary construction rotatable relative to the steering head 50. The bolt 96 allows the clamp load to be adjusted in service without disassembling other portions of the steering assembly 18 of the motorcycle 10.

Various features and advantages of the invention are set forth in the following claims.

The invention claimed is:

1. A motorcycle comprising:
 a main frame configured to support a drive unit, at least one rear wheel, and at least one seat;
 a steering head fixedly secured to the main frame and having a bore between a first end and a second end of the steering head, the bore defining a steering axis; and
 a steering stem assembly including
  at least one steerable front wheel rotatable about the steering axis relative to the steering head,
  a first stem member extending into the bore from the first end, and
  a second stem member extending into the bore from the second end,
 wherein the first stem member is fixedly secured to the second stem member within the bore, and wherein neither one of the first stem member and the second stem member extends all the way through the bore.

2. The motorcycle of claim 1, wherein the first stem member is removably secured to the second stem member at a joint within the bore.

3. The motorcycle of claim 2, wherein the joint is a threaded joint.

4. The motorcycle of claim 1, further comprising:
a lower support assembly including the first stem member and a first bearing having an inner race, the inner race of the first bearing being coupled to the first stem member by a press-fit engagement; and
an upper support assembly including the second stem member and a second bearing having an inner race, the inner race of the second bearing being coupled to the second stem member by a press-fit engagement.

5. The motorcycle of claim 4, wherein the second stem member includes a male threaded portion that is threadingly received within a female threaded portion of the first stem member.

6. The motorcycle of claim 4, wherein each of the first and second bearings includes an outer race that is separable from the inner race, and a set of tapered rollers positioned between a tapered inner surface of the outer race and a tapered outer surface of the inner race.

7. The motorcycle of claim 4, further comprising a lower triple clamp secured to the lower support assembly and an upper triple clamp secured to the upper support assembly, the upper and lower triple clamps cooperating to support a pair of fork tubes.

8. A motorcycle comprising:
a main frame configured to support a drive unit, at least one rear wheel, and at least one seat;
a steering head fixedly secured to the main frame and having a bore between a first end and a second end of the steering head, the bore defining a steering axis; and
a steering stem assembly including
at least one steerable front wheel rotatable about the steering axis relative to the steering head,
a lower support assembly including a first stem member and a first bearing having an inner race, the inner race of the first bearing being coupled to the first stem member by a press-fit engagement, and
an upper support assembly including a second stem member and a second bearing having an inner race, the inner race of the second bearing being coupled to the second stem member by a press-fit engagement,
wherein the first stem member is secured to the second stem member within the bore.

9. The motorcycle of claim 8, wherein the steering stem defines a length, each of the first and second stem members defining substantially less than 100 percent of the length.

10. The motorcycle of claim 8, wherein the first stem member does not extend all the way through the bore.

11. The motorcycle of claim 10, wherein neither one of the first stem member and the second stem member extends all the way through the bore.

12. The motorcycle of claim 8, wherein the first stem member is removably secured to the second stem member at a joint within the bore.

13. A motorcycle comprising:
a main frame configured to support a drive unit, at least one rear wheel, and at least one seat;
a steering head fixedly secured to the main frame and having a bore between a first end and a second end of the steering head, the bore defining a steering axis; and
a steering stem assembly including
at least one steerable front wheel rotatable about the steering axis relative to the steering head,
a first stem member extending into the bore from the first end and including a terminal end positioned within the bore, and
a second stem member extending into the bore from the second end and including a terminal end positioned within the bore,
wherein the first stem member is fixedly secured to the second stem member within the bore.

14. The motorcycle of claim 13, wherein the first stem member is removably secured to the second stem member at a joint within the bore.

15. The motorcycle of claim 13, further comprising:
a lower support assembly including the first stem member and a first bearing having an inner race, the inner race of the first bearing being coupled to the first stem member by a press-fit engagement; and
an upper support assembly including the second stem member and a second bearing having an inner race, the inner race of the second bearing being coupled to the second stem member by a press-fit engagement.

16. The motorcycle of claim 15, wherein the terminal end of the first stem member is spaced below the second bearing and the terminal end of the second stem member is spaced above the first bearing.

17. The motorcycle of claim 15, wherein each of the first and second bearings includes an outer race that is separable from the inner race, and a set of tapered rollers positioned between a tapered inner surface of the outer race and a tapered outer surface of the inner race.

18. The motorcycle of claim 15, further comprising a lower triple clamp secured to the lower support assembly and an upper triple clamp secured to the upper support assembly, the upper and lower triple clamps cooperating to support a pair of fork tubes.

19. The motorcycle of claim 13, wherein the terminal end of the first stem member is spaced from the terminal end of the second stem member along the steering axis.

* * * * *